(12) United States Patent
Schmollgruber et al.

(10) Patent No.: US 10,142,615 B2
(45) Date of Patent: Nov. 27, 2018

(54) SYSTEM FOR THREE-DIMENSIONAL IMAGE CAPTURE WHILE MOVING

(71) Applicant: STEREOLABS, Orsay (FR)

(72) Inventors: Cecile Schmollgruber, Boulogne Bilancourt (FR); Edwin Michel Azzam, L'Hay les Roses (FR); Olivier Antoine Braun, Vanves (FR); Marc Beudet, Paris (FR)

(73) Assignee: STEREOLABS, Orsay (FR)

( * ) Notice: Subject to any disclaimer, the term of this patent is extended or adjusted under 35 U.S.C. 154(b) by 0 days.

(21) Appl. No.: 15/536,762

(22) PCT Filed: Dec. 16, 2015

(86) PCT No.: PCT/FR2015/053553
§ 371 (c)(1),
(2) Date: Jun. 16, 2017

(87) PCT Pub. No.: WO2016/097609
PCT Pub. Date: Jun. 23, 2016

(65) Prior Publication Data
US 2017/0332068 A1    Nov. 16, 2017

(30) Foreign Application Priority Data
Dec. 19, 2014  (FR) .................................. 14 62999

(51) Int. Cl.
*H04N 13/20*    (2018.01)
*H04N 13/296*   (2018.01)
(Continued)

(52) U.S. Cl.
CPC ......... *H04N 13/296* (2018.05); *H04N 5/2327* (2013.01); *H04N 5/23254* (2013.01);
(Continued)

(58) Field of Classification Search
CPC ............... H04N 13/296; H04N 13/139; H04N 5/23254; H04N 5/2327; H04N 2013/0081; H04N 2013/0085
(Continued)

(56) References Cited

U.S. PATENT DOCUMENTS 6,392,688 B1    5/2002  Barman et al.
6,859,565 B2 *  2/2005  Baron ................. H04N 5/2354
                                              348/E5.038
(Continued)

FOREIGN PATENT DOCUMENTS

JP    2009-208670 A    9/2009

OTHER PUBLICATIONS

European Patent Office; International Search Report in International Patent Application No. PCT/FR2015/053553 (dated Mar. 18, 2016).

*Primary Examiner* — Michael Lee
(74) *Attorney, Agent, or Firm* — Leydig Voit and Mayer

(57) ABSTRACT

A system for three-dimensional image capture while moving. The system includes: an image capture device including at least two digital image sensors placed to capture a stereoscopic image; a processor for obtaining disparity information, associated with the digital images obtained by the image capture device and movement speed of elements in the digital images; a transmitter for sending the digital images to enable control of movement based on the digital images and the associated disparity information; and a controller for controlling the image capture device.

14 Claims, 2 Drawing Sheets

Figure 1:
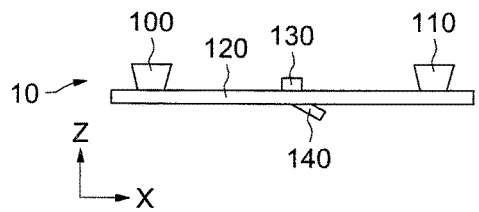

(51) Int. Cl.
*H04N 5/232* (2006.01)
*H04N 13/239* (2018.01)
*H04N 13/00* (2018.01)

(52) U.S. Cl.
CPC ... *H04N 13/239* (2018.05); *H04N 2013/0081* (2013.01); *H04N 2013/0085* (2013.01)

(58) Field of Classification Search
USPC ... 348/194, 113, 154, 155, 159, 169, 40, 42, 348/44, 47, 48, 49, 50, 51, 425.4, 428.1, 348/464, 495, 500, 513, 516, 521, 525, 348/540, 608, 636, 680, 682, 693, 723, 348/46; 345/6, 419, 652, 663, 678; 382/103, 154, 173, 275
See application file for complete search history.

(56) References Cited

U.S. PATENT DOCUMENTS

| | | | |
|---|---|---|---|
| 2002/0042671 A1* | 4/2002 | Chen | B60K 28/16 701/41 |
| 2003/0123238 A1* | 7/2003 | Yu | H05K 1/0218 361/780 |
| 2006/0288368 A1* | 12/2006 | Huslak | H04N 5/44543 725/46 |
| 2007/0064975 A1* | 3/2007 | Takanohashi | H04N 5/144 382/103 |
| 2007/0296846 A1 | 12/2007 | Barman et al. | |
| 2009/0066782 A1 | 3/2009 | Choi et al. | |
| 2010/0060962 A1* | 3/2010 | Rosen | G03H 1/0005 359/29 |
| 2011/0141275 A1* | 6/2011 | Toda | G01C 21/165 348/142 |
| 2011/0150322 A1* | 6/2011 | Bedros | G06K 9/00201 382/154 |
| 2012/0108971 A1 | 5/2012 | Miyama et al. | |
| 2013/0016199 A1* | 1/2013 | Kobayashi | A61B 1/00006 348/65 |
| 2013/0044910 A1* | 2/2013 | Cord | G06T 7/12 382/100 |
| 2013/0121560 A1* | 5/2013 | Hirai | G06K 9/00261 382/154 |
| 2014/0111953 A1* | 4/2014 | McClure | G06F 3/044 361/749 |
| 2014/0378159 A1* | 12/2014 | Dolbakian | H04W 64/006 455/456.1 |
| 2015/0049173 A1* | 2/2015 | Kim | H04N 13/021 348/49 |
| 2016/0128666 A1* | 5/2016 | Grasruck | A61B 6/582 378/19 |

* cited by examiner

SYSTEM FOR THREE-DIMENSIONAL IMAGE CAPTURE WHILE MOVING

TECHNICAL BACKGROUND

The invention relates to a stereoscopic image capture system. Such a system commonly comprises a device described as a 3D camera, or stereoscopic camera.

The invention particularly considers a stereoscopic image capture system that provides depth information, or equivalent information. The cameras of these systems are described as depth sensors, or depth cameras. These sensors make it possible to obtain images captured from two points of view, which, after processing, make it possible to obtain depth information, or any equivalent information, generally described as disparity information. It is obtained point by point (pixel by pixel) in the image, and referred to as a depth map.

The invention in particular relates to a stereoscopic image capture system for capturing images while moving, at low or high speed, within an environment made up of stationary or static objects that are opposite the device for capturing images of the relative movements.

Depth cameras are known based on the measurement of a time of flight of a light wave emitted by illumination means such as LEDs, and reflected the encountered objects. The wave may be an infrared wave. The time of flight, measured pixel by pixel, makes it possible to determine the distance of the reflective surface from the transmitting device. Time of flight cameras have the flaw of being sensitive to disruptions, such as infrared waves emitted by the environment, in particular the sun, or interference, in particular coming from other time of flight cameras, for example encountered during the movement of the vehicle with the camera on board and that passes other vehicles with similar cameras on board.

LIDAR (light detection and ranging) systems, or laser radars, are also known reading (scanning) the environment with a generally coherent light, emitted by scanning using a heavy mechanical system that must be very precise. The system is cumbersome, and requires regular maintenance, due to the mechanical scanner system. It is more expensive for these two reasons. It is also blinded in case of rain and fog by the reflection caused by the cloudiness.

Also known is document US 20070296846, which discloses a stereoscopic camera comprising two digital image sensors placed at a distance from one another by a chassis. The positioning of the sensors is obtained by a precise mechanical engagement between the parts. Also known is a stereoscopic camera called Bumblebee comprising two or three digital image sensors, communicating using a FireWire interface (IEEE-1394) and a GPIO (General-Purpose Input/Output) port, having a fixed image capture frequency and a fixed resolution. A first computer program is run on a microcomputer connected to the camera by the two connections, and makes it possible to control the camera, while a second computer program run on the microcomputer makes it possible to perform stereoscopic correlations to generate an image of the disparities. But since the resolution and the image capture frequency are fixed, it is not possible to use this camera dynamically and adaptively in an environment in which some objects are observed in rapid relative movement, and others in slow relative movement.

Also known is a stereoscopic camera called Duo3D, in which the image capture frequency is configurable by a programming interface command, related in predefined modes to resolutions in both dimensions of the image that are modified by binning. However, this camera is configured for the computerized perception of objects at a short distance, and is not suitable for observing an environment during movement.

There is therefore a need for a stereoscopic image capture system providing adaptive image capture in the face of relative movements of objects around the image capture device.

SUMMARY OF THE INVENTION

To resolve this problem, a system is proposed for capturing three-dimensional images during a movement, comprising:

an image capture device including at least two digital image sensors synchronized with one another and arranged to perform a stereoscopic image capture, processing means to obtain disparity information associated with the digital images obtained by the image capture device as well as a movement speed of elements in said images, a means for transmitting digital images to make it possible to control the movement based on said digital images and the associated disparity information, and a control means to command the image capture device by optimizing, to facilitate said movement control, the choice of the dimensions of the field of view of the sensors and the frequency of the image capture, taking into account a maximum throughput tolerated by the transmission means and said movement speed.

Owing to this system, it is possible to provide a device for controlling the movement of images captured with a frequency and a field of view suitable for the movement, in light of the relative speeds of the objects around the image capture device, with respect to the image capture device, which is then onboard the moving object needing to be controlled.

Advantageously, the image capture system according to the invention may comprise at least one of the following technical features:

said speed is assessed by a contrast gradient calculation done on the digital images, the means for transmitting digital images comprises a USB 3.0 connection, a Giga Ethernet connection or a Thunderbolt connection, the processing means comprises a computer program to be run on a microcomputer, the processing means comprises a chipset on a printed circuit substrate, the dimensions of the field of view used by the sensors and the image capture frequency can also be set by a user, the two sensors are master and slave, respectively, for synchronization purposes, the image capture device comprises a digital image processing controller placed on a printed circuit substrate shared by the two sensors, the means for transmitting digital images comprises a means for transmitting said images between the image capture device and at least one of the processing means, the means for transmitting digital images comprises a means for transmitting said images and the disparity information to a means for controlling the movement, if elements are observed that are moving quickly, the capture frequency is increased, while the field of view is restricted, and if elements are observed moving slowly, said frequency is decreased, while the field of view is extended.

The invention also relates to an object provided with movement means and comprising an image capture system according to the invention, said object comprising means for sending a human operator or an electronic module the disparity information associated with the digital images produced by said system for three-dimensional image capture, in order to control the movement of said object.

The object may additionally comprise means for moving in the context of autonomous navigation by using the disparity information associated with the digital images obtained by said system for three-dimensional image capture.

BRIEF DESCRIPTION OF DRAWING FIGURES

Figure 3:
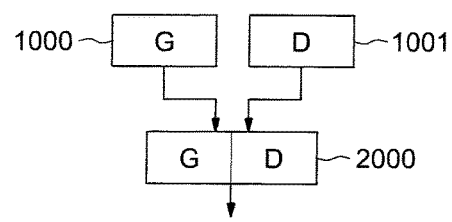
Figure 2:
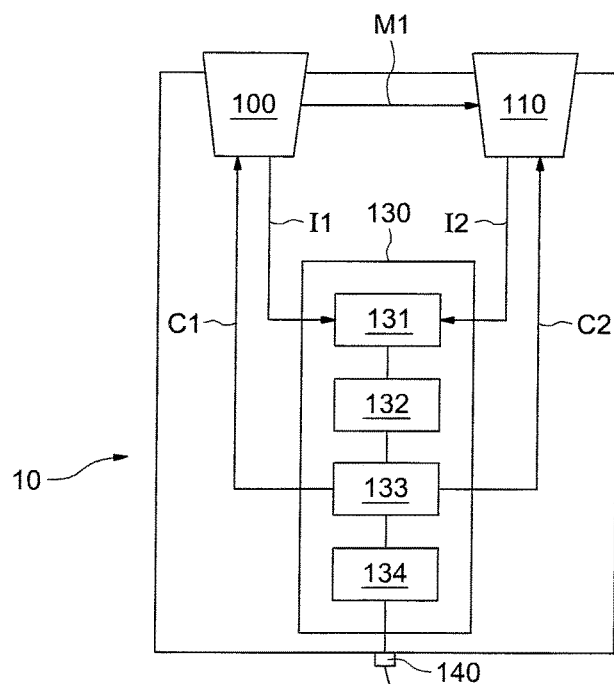
Figure 2:
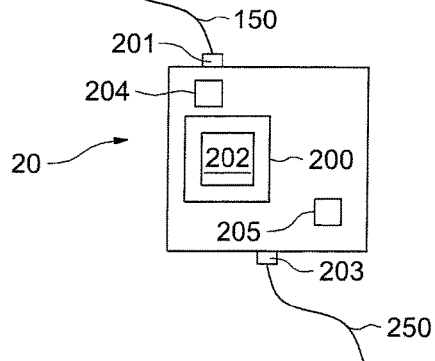
Figure 4:
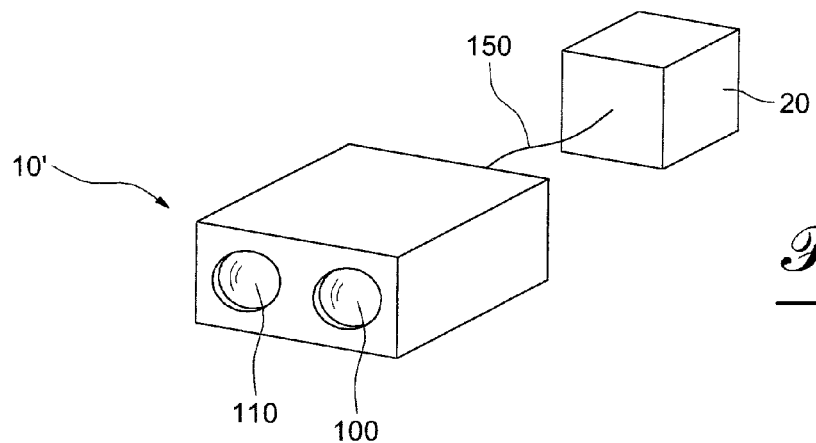
Figure 5:
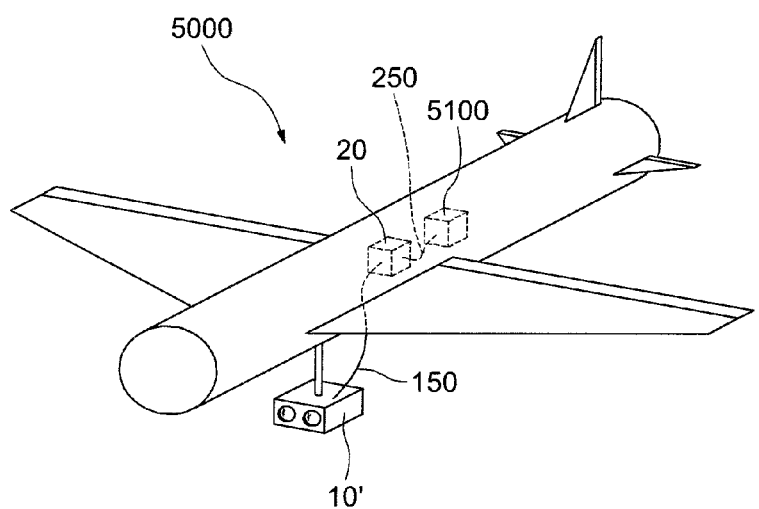
Figure 6:
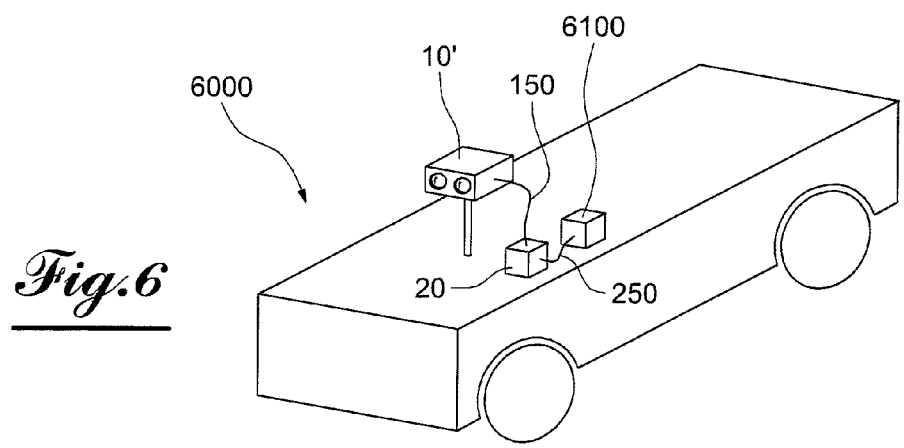

The invention will be better understood, and other aims, features, details and advantages thereof will appear more clearly, in the following explanatory description done in reference to the appended drawings, provided solely as an example illustrating one embodiment of the invention, and in which:

FIG. 1 is a general view in space of one embodiment of an image capture device according to the invention, FIG. 2 is a diagram showing the operation of the elements of one embodiment of an image capture device according to the invention, FIG. 3 is one aspect of the operation of an image capture device according to the invention, FIG. 4 shows an outside view of one embodiment of an image capture device according to the invention, FIGS. 5 and 6 show example embodiments of the image capture device according to the invention.

DETAILED DESCRIPTION OF THE INVENTION

FIG. 1 provides a schematic view of an electronic board of an image capture device 10 according to one embodiment of the invention. The board 10 is formed by a single printed circuit substrate supporting electronic components. The image capture device board 10 comprises a first digital image sensor 100 and a second digital image sensor 110, which can be CCD (charge-coupled device) sensors or sensors using another technology, such as the CMOS technology, and receive light through an optical lens focusing system (not shown).

The selected sensors 100 and 110 have an active surface that can be controlled by a command outside the sensor, and which can be used for different viewing angle dimensions, or different resolutions. They may also be controlled to capture images at different frequencies.

The sensors 100 and 110 are both positioned on a printed circuit substrate 120. The substrate 120 can be an elongated rectangle, the large dimension of which is placed along a direction X, and the two sensors are then placed substantially at both ends of the rectangle in the direction X. The two sensors 100 and 110 are positioned with their sensitive surfaces oriented opposite the substrate 120, turned substantially in a direction Z perpendicular to the direction X, and normal to the plane of the printed circuit substrate 120.

On the printed circuit substrate 120 is a controller 130, in the form of an integrated circuit electrically connected to the two sensors 100 and 110. The controller 130 receives commands from third-party components and provides operating parameters to the sensors 100 and 110. It furthermore verifies that these commands have indeed been received and understood by the sensors 100 and 110.

Additionally, the printed circuit substrate 120 bears a connector 140, making it possible to connect the image capture device 10 to a third-party device.

FIG. 2 functionally shows the image capture device board 10, and its interaction with an outside processing and control unit 20. The first sensor 100 and the second sensor 110 are again shown, as well as the controller 130 and the connector 140. The controller 130 runs several programs constituting several modules 131, 132, 133 at 134 that will be outlined later. The controller 130, the sensors 100 and 110 and the connector 140 communicate via tracks of conductive material (copper) of the board 10.

Each of the first and second sensors 100 and 110 captures digital images at an identical frequency for both sensors, and set by the controller 130, which executes a program forming an image sensor processing module 133. This module 133 sends control commands of the first sensor C1 and control commands of the second center C2 to both sensors, in particular to define the capture frequency of the images.

The first sensor 100 regularly sends a synchronization message M1 to the second sensor 110, to allow the latter to align the capture moments of its images with the capture moments of the images by the first sensor 100. This involves a master-slave mode synchronization, the first sensor 100 acting as master, imposing the capture moments, and the second sensor 110 acting as slave, applying the instruction received to implement the image capture.

The sensors 100 and 110 send the images they capture to the controller 130, via messages I1 and I2 comprising the color and brightness information of the pixels. The captured and transmitted images are rectangular, the rectangles of the two sensors being identical (same width, same height, same orientation).

A first program constitutes a receiving and resynchronization module 131, responsible for receiving the digital images captured by the sensors 100 and 110 and re-synchronizing them such that the following programs implemented by the controller 130 are able to recognize the pairs of images sent by the first and second sensors 100 and 110.

A second program constitutes a merging module 132 responsible for merging the two images taken at the same time by the two sensors, and transmitted by the module 131. The two images are merged into a single digital image, as will be described in connection with FIG. 3. The single merged image is sent to the following module.

The following module, already described, constitutes an image sensor processing (ISP) module 133. In some embodiments, it may perform parallel calculations to specify the color and light of each pixel. Once its processing is complete, it sends the image to the following module.

The next program defines a fourth module, which is a conversion module 134, responsible for converting the data making up the digital images, and potentially other information, into a format compatible with the transmission via a wired connector 150 connected to the connector 140, and conversely, extracting the information received by the wired connector 150 and the connector 140 to send it to the image sensor processing module 133.

The wired module 150, which for example is flexible, connects the connector 140 to a connector 201 of the outside processing and control unit 20. The wired connector 150 can perform an electrical or optical transmission.

The outside processing and control unit 20 comprises a connector 201, and a processor 200 that runs a processing and control program 202. It also comprises a conversion module 204 for the reception and sending of data by the connector 201, which may be run by the processor 200 or a dedicated controller.

In one embodiment, the transmission by the wired connector 150 is done according to standard USB 3.0. The conversion module 134 and the wired connector 150, as well as the connectors 140 and 201, are configured to implement standard USB 3.0. Other standards can be used, in particular the Gigethernet and Thunderbolt standards.

The processor 200 implements the processing and control program 202, which uses the digital images transmitted by the image sensor processing module 133. In particular, the disparity or depth information is calculated for each pair of synchronized images.

Furthermore, a contrast gradient calculation makes it possible to assess the presence of motion blurring in the images.

The processing and control program 202 is also able to send commands to the controller 130 of the image capture device 10, for example via the wired connector 150, or by another wired or wireless means.

Depending on the result of the contrast gradient calculation, the processing and control program 202 is able to command automatically, or with agreement from a user to whom the command is suggested by the program, a change in the choice of the dimensions of the field of view of the sensors 100 and 110 and the image capture frequency by the sensors. This choice is framed by the relationship $$\text{width} \times \text{height} \times 16 \times \text{frequency max throughput}$$

wherein the width and height are expressed in pixels and the maximum throughput in bits/s. The maximum throughput is that of the connection between the image capture device 10 and the outside processing and control unit 20, which is for example the maximum throughput of a USB 3.0 connection.

If motion blurring is detected, it is then chosen to decrease the field of view and increase the image capture frequency, to improve the vision of the objects in relative movement around the image capture device 10.

If little or no motion blurring is observed, it is chosen to increase the field of view and decrease the image capture frequency, to improve the perception of the environment, including on the sides.

The outside processing and control unit 20 includes a second connector 203, as well as a second conversion module 205 for the reception and transmission of data by the connector 203, which can be done by the processor 200 or a dedicated controller.

The outside processing and control unit 20 can assume the form of a multifunctional computer or a unit dedicated to controlling the image capture device 10. In the second case, it may for example be built in the form of a single printed circuit board bearing the connectors 201 and 203, as well as a processor 200, which can then run both the program 202 and the modules 204 and 205.

The module 205 allows the outside processing and control unit 20 to communicate with a third-party device, via a second wired connection means 250. The second wired connector 250 can perform an electrical or optical transmission. This is for example a USB 3.0 cable, or a Giga Ethernet or Thunderbolt connection.

The processing and control unit 20 sends the stereoscopic digital images and the disparity or depth information associated therewith via the wired connector 250. Thus, a three-dimensional depiction of the image captured by the image capture device 10 is provided, either to a human user, or to a software program capable of exploiting it.

FIG. 3 shows the merging process implemented by the merging module 132.

Two images 1000 and 1001 have been captured by the sensors 100 and 110 (FIG. 1). Their content is referenced G and D in the figure, to indicate that these are images captured by the left and right sensors, respectively, of the image capture device 10. The two images are each a rectangular set of pixels with the same heights and the same lengths. They are subject to merging by the merging module 132, which creates a single image 2000 made up of a rectangular set of pixels, of the same height as the two images 1000 and 1001 and twice the length relative to the length of the images 1000 and 1001. The left side of the right image D is placed next to the right side of the left image G.

FIG. 4 shows a three-dimensional view of one embodiment of the image capture device. It may for example assume the form of a box 10' generally in the shape of a rectangular rhomb or the like, in which the electronic components of the device are contained, and which has two openings to the light on one face, through which the first and second sensors 100 and 110 expose their respective sensitive surfaces to capture digital images. The wired connector 250 allowing the extraction of the digital data is not visible.

FIG. 5 shows a use of an image acquisition device box 10' in a flying object 5000 of the drone type capable of moving without human intervention, or remotely controlled by a human. The flying object 5000 carries an image acquisition device box 10', as well as an outside processing and control unit 20, connected by a wired connection means 150. It also comprises an autonomous navigation module 5100, interacting with the outside processing and control unit 20, via a wired connection means 250. The autonomous navigation unit 5100 uses the stereoscopic images provided by the image capture device and the associated disparity or depth information, pixel by pixel, to make navigation decisions. The navigation decisions are of better quality if the dimensions of the field of view of the sensors and the image capture frequency have been chosen carefully and are readjusted regularly, reactively based on the environment and objects observed in the images and their relative speed with respect to the flying object 5000.

Likewise, in FIG. 6, the same principle is presented, this time with a rolling object 6000 of the autonomous car type capable of moving without human intervention in a complex environment, for example a road or urban environment. The vehicle can also be a construction vehicle or a wagon moving in a warehouse, for example.

For the objects 5000 and 6000, the navigation can be autonomous or computer-assisted navigation, the decision-making in this case always being done by a human, but the latter having additional information obtained owing to the image capture device and the associated system.

In one alternative, the box 10' of the image capture device can incorporate the control unit 20 inside it, and be on board a vehicle such that the user simply connects the box 10', which is then the only one, to the autonomous navigation module 5100 or 6100 using the wired connection means 250. The wired connection means 150 is then inside the box 10'.

Within the single box 10', in one alternative, the processor 200 can also be mounted on the board 10, and communicate via a connection using conductive metal tracks (copper), with the module 133 of the controller 130, in place of the communication via the wired connection means 150, the connectors 140 and 201 and the conversion module 134.

The maximum throughput value used to command a change in the choice of dimensions of the field of view of the sensors 100 and 110 and the image capture frequency by the sensors is in this case that of the wired connection means 250.

In another alternative, the control unit 20 and the autonomous navigation unit 5100 or 6100 are embodied by a same piece of computer equipment, having a processor that runs both the autonomous navigation program and the processing and control program 202. The connection 250, the connector 203 and the conversion module 205 are then absent.

In general, the maximum throughput value used to command a change in the choice of the dimensions of the field of view of the sensors 100 and 110 and the image capture frequency by the sensors is that of the most limiting connection for the transmission of the digital images to obtain disparity information and to send digital images to the navigation module.

The invention is not limited to the described embodiment, but extends to all alternatives within the scope of the claims.

The invention claimed is:

1. A system mounted on an object capable of movement for capturing three-dimensional images from the object, wherein the system comprises:
   an image capture device including at least two digital image sensors, synchronized with each other, producing digital images, and capturing a stereoscopic image,
   a processor obtaining disparity information associated with the digital images captured by the image capture device and movement speed of elements in the digital images,
   a transmission connector controlling movement of the object, based on the digital images and the disparity information associated with the digital images, and
   a first controller commanding the image capture device, by modifying, to facilitate controlling the movement of the object, dimensions of fields of view of the digital image sensors, and frequency of stereoscope image capture, taking into account maximum throughput tolerated by the transmission connector and the movement speed of elements in the digital images, wherein,
       if the elements in the digital images are moving relatively quickly, the frequency of stereoscopic image capture is increased and the field of view is retracted, and,
       if the elements in the digital images are moving relatively slowly, the frequency of stereoscopic image capture is decreased and the field of view is expanded.

2. The system mounted on an object capable of movement for capturing three-dimensional images from the object according to claim 1, wherein the movement speed of elements in the digital images is assessed by a contrast gradient calculation on the digital images.

3. The system mounted on an object capable of movement for capturing three-dimensional images from the object according to claim 1, wherein the transmission connector comprises one of a USB 3.0 connection, a Giga Ethernet connection, and a Thunderbolt connection.

4. The system mounted on an object capable of movement for capturing three-dimensional images from the object according to claim 1, wherein the processor comprises a computer program to be run on a microcomputer.

5. The system mounted on an object capable of movement for capturing three-dimensional images from the object according to claim 1, wherein the processing means processor comprises a chipset on a printed circuit substrate.

6. The system mounted on an object capable of movement for capturing three-dimensional images from the object according to claim 1, wherein the dimensions of the fields of view of the digital image sensors and the frequency of stereoscopic image capture can be set by a user.

7. The system mounted on an object capable of movement for capturing three-dimensional images from the object according to claim 1, wherein the two digital image sensors are master and slave, respectively, for synchronization purposes.

8. The system mounted on an object capable of movement for capturing three-dimensional images from the object according to claim 1, wherein
   the image capture device comprises a digital image processing controller and a printed circuit substrate, and
   the controller and the two digital image sensors are located on a printed circuit substrate of a shared substrate.

9. The system mounted on an object capable of movement for capturing three-dimensional images from the object according claim 1, wherein the transmission connector comprises a wire for transmitting the digital images between the image capture device and the processor.

10. The system mounted on an object capable of movement for capturing three-dimensional images from the object according to claim 1, further comprising a second controller controlling the movement of the object, wherein the transmission connector comprises a wire for transmitting the digital images and the disparity information associated with the digital images to second controller.

11. An autonomously navigating vehicle comprising:
    an object capable of moving: and
    a system mounted on the object and capturing three-dimensional images from the object, wherein
        the system comprises
            an image capture device including at least two digital image sensors, synchronized with each other, producing digital images, and capturing a stereoscopic image,
            a processor obtaining disparity information associated with the digital images captured by the image capture device and movement speed of elements in the digital images,
            a transmission connector controlling movement of the object, based on the digital images and the disparity information associated with the digital images, and
            a first controller commanding the image capture device, by modifying, to facilitate controlling the movement of the object, dimensions of fields of view of the digital image sensors, and frequency of stereoscope image capture, taking into account maximum throughput tolerated by the transmission connector and the movement speed of elements in the digital images, wherein,
                if the elements in the digital images are moving relatively quickly, the frequency of stereoscopic image capture is increased and the field of view is retracted, and,
                if the elements in the digital images are moving relatively slowly, the frequency of stereoscopic image capture is decreased and the field of view is expanded, and
        the object comprises an autonomous navigator sending a human operator or an electronic module the disparity information associated with the digital images produced by the system and controlling the movement of the object.

12. The autonomously navigating vehicle according to claim 11, wherein the autonomous navigator moves the object in autonomous navigation using the disparity information associated with the digital images.

13. A method for controlling movement of an object including an on-board system for three-dimensional image capture, the method comprising:
    capturing digital images using at least two digital image sensors synchronized with each other and capturing a stereoscopic image,
    obtaining movement speed of elements in the digital images,
    obtaining disparity information associated with pairs of synchronized digital images,
    controlling movement of the object based on the digital images and the disparity information associated with the digital images,
    modifying, to facilitate control of the movement of the object, dimensions of fields of view of the sensors and frequency of capture of the digital images, taking into account maximum throughput tolerated and the movement speed of elements in the digital images, wherein,
    if the elements in the digital images are moving relatively quickly, the frequency of stereoscopic image capture is increased, and the field of view is retracted, and,
    if the elements in the digital images are moving relatively slowly, the frequency of stereoscopic image capture is decreased, and the field of view is expanded,
    sending the digital images and the disparity information associated with the digital images to a navigation unit, and
    controlling the movement of the object, based on the digital images and the disparity information associated with the pairs of synchronized digital images, with the navigation unit.

14. The method for controlling movement of the object according to claim 13, wherein the navigation unit is an autonomous navigation unit.

* * * * *